(12) United States Patent
Abe et al.

(10) Patent No.: US 8,476,527 B2
(45) Date of Patent: Jul. 2, 2013

(54) RESIN COMPOSITION AND HIGH-FREQUENCY CO-AXIAL CABLE USING SAME

(75) Inventors: Masahiro Abe, Hitachi (JP); Masafumi Nagano, Hitachi (JP); Akinari Nakayama, Hitachinaka (JP)

(73) Assignee: Hitachi Cable, Ltd., Tokyo (JP)

( * ) Notice: Subject to any disclaimer, the term of this patent is extended or adjusted under 35 U.S.C. 154(b) by 204 days.

(21) Appl. No.: 12/817,572

(22) Filed: Jun. 17, 2010

(65) Prior Publication Data
US 2010/0319957 A1 Dec. 23, 2010

(30) Foreign Application Priority Data
Jun. 19, 2009 (JP) ................. 2009-146863

(51) Int. Cl.
*H01B 7/00* (2006.01)
(52) U.S. Cl.
USPC .......... 174/110 R; 174/110 SR; 174/110 PM; 174/110 F
(58) Field of Classification Search
USPC .......... 174/102 R, 110 R, 113 R, 102 SC, 174/120 R, 120 SR; 427/487, 388.1–388.2
See application file for complete search history.

(56) References Cited

U.S. PATENT DOCUMENTS

| | | | | |
|---|---|---|---|---|
| 4,276,251 A | * | 6/1981 | Bopp | 264/169 |
| 4,390,666 A | * | 6/1983 | Moriguchi et al. | 525/194 |
| 4,549,041 A | * | 10/1985 | Shingo et al. | 174/113 R |
| 4,614,764 A | * | 9/1986 | Colombo et al. | 525/72 |
| 4,769,514 A | * | 9/1988 | Uematsu et al. | 174/102 A |
| 6,270,856 B1 | * | 8/2001 | Hendewerk et al. | 427/487 |

FOREIGN PATENT DOCUMENTS

| | | |
|---|---|---|
| JP | 57-143 | 1/1982 |
| JP | 57-103621 | 6/1982 |
| JP | 2002-251923 | 9/2002 |
| JP | 2005-343916 | 12/2005 |
| JP | 2006-22276 | 1/2006 |
| JP | 2006-100160 | 4/2006 |
| JP | 2007-51190 | 3/2007 |
| JP | 2008-027899 | 2/2008 |

OTHER PUBLICATIONS

Communication mailed Jun. 26, 2012, in connection with Japanese Patent Application No. 2009-146863, 3 pages; Japanese Patent Office, Japan.

* cited by examiner

*Primary Examiner* — William H Mayo, III
(74) *Attorney, Agent, or Firm* — Antonelli, Terry, Stout & Kraus, LLP.

(57) ABSTRACT

A resin composition is made of a mixture including a crosslinked polyethylene and a non-crosslinked polyethylene. The mixture has a density of 0.960 g/cm³ or more and a melt fracture tension within a range from 20 to 100 mN. A high-frequency co-axial cable includes sequentially: an internal conductor; an internal solid layer; a foamed insulation layer; an external solid layer; an external conductor; and an outer coat. The foamed insulation layer of includes a foam body of the above resin composition.

20 Claims, 1 Drawing Sheet

RESIN COMPOSITION AND HIGH-FREQUENCY CO-AXIAL CABLE USING SAME

CLAIM OF PRIORITY

The present application claims priority from Japanese patent application serial no. 2009-146863 filed on Jun. 19, 2009, the content of which is hereby incorporated by reference into this application.

BACKGROUND OF THE INVENTION

1. Field of the Invention

The present invention relates to a resin composition for a foamed insulator of high-frequency co-axial cables utilized in mobile communication facilities and microwave communication facilities, and also relates to high-frequency co-axial cables using the resin composition.

2. Description of Related Art

High-frequency co-axial cables which are utilized in mobile communication facilities necessary for cellular phones and in TV stations' microwave communication facilities tend to take higher and higher service frequencies in order to increase communication rate and communication capacity. Accordingly, there is a need for high-frequency co-axial cables exhibiting a less signal attenuation. The amount of signal attenuation of the co-axial cable is the sum of conductor loss attributable to the conductor diameter and dielectric loss attributable to the insulator material (e.g., polyethylene).

However, the conductor loss cannot easily be changed because it is determined by the shape of the cable. Therefore, to reduce the amount of signal attenuation, it is necessary to reduce the dielectric loss.

Typically, the dielectric loss is expressed by the relationship shown in the following Eq. (1). Herein, the dielectric constant is denoted by $\in$, dielectric tangent is denoted by $\tan \delta$, and frequency is denoted by f.

$$\text{Dielectric Loss} \propto \sqrt{\in} \times \tan \delta \times f \quad (1)$$

Generally, the dielectric tangent (hereafter, abbreviated as $\tan \delta$) of high-density polyethylene (HDPE) is smaller than that of low-density polyethylene (LDPE). It is considered that this is because the high-density polyethylene has fewer side chains in the molecular structure. Accordingly, the high-density polyethylene is used in many cases as a main material of resin composition for the insulator material of the co-axial cable.

Besides the $\tan \delta$ of the main material, it has been proposed to decrease the dielectric loss by taking a foamed insulator which is created by chemically or physically foaming a resin composition when molding the insulator (see, e.g., JP-A 2008-027899 and JP-A 2002-251923).

However, since the high-density polyethylene has a small number of branches and its molecules do not intertwine much, the melt fracture tension (MT) is also small. For this reason, if the high-density polyethylene is used and the foaming degree of the foamed insulator is increased, bubbles do not separately disperse but are prone to coalesce to be continuous bubbles (air holes), i.e., bubbles flock together. As a result, the voltage standing wave ratio (VSWR) increases (worsens). Thus, conventionally, a low-density polyethylene having a large melt fracture tension has been frequently blended at the sacrifice of $\tan \delta$ (dielectric loss).

SUMMARY OF THE INVENTION

In view of the foregoing, it is an objective of the present invention to address the above problems and to provide a resin composition exhibiting a small dielectric loss, in which fine bubbles can be separately dispersed to be a foamed insulator made of a high-density polyethylene. Furthermore, it is another objective of the invention to provide high-frequency co-axial cables using the resin composition, in that both the voltage standing wave ratio (VSWR) indicating the stability along the longitudinal direction of the cable and the amount of signal attenuation are small.

According to one aspect of the present invention, there is provided a resin composition made of a mixture of a crosslinked polyethylene and a non-crosslinked polyethylene, and having a density of 0.960 g/cm$^3$ or more and a melt fracture tension within a range from 20 to 100 mN.

In the above aspect of the invention, the following modifications and changes can be made.

(i) The mixture comprises 5 to 45 mass % of the crosslinked polyethylene and 95 to 55 mass % of the non-crosslinked polyethylene.

(ii) The crosslinked polyethylene is crosslinked such that a high-density polyethylene is irradiated with 0.1 to 5.0 Mrad of electron beam.

(iii) The crosslinked polyethylene is crosslinked such that 0.2 to 1.0 parts by mass of a silane compound is added to 100 parts by mass of a high-density polyethylene.

(iv) The crosslinked polyethylene is crosslinked such that an organic peroxide is added to a high-density polyethylene.

(v) There is provided a high-frequency co-axial cable comprising sequentially: an internal conductor; an internal solid layer; a foamed insulation layer; an external solid layer; an external conductor; and an outer coat, the foamed insulation layer being composed of a foam body of the above resin composition.

(vi) The foamed insulation layer exhibits dielectric tangent value of $2.0 \times 10^{-4}$ or less at 2 GHz by a cavity resonance perturbation method.

ADVANTAGES OF THE INVENTION

According to the present invention, it is possible to provide a resin composition exhibiting a small dielectric loss in which fine bubbles are separately dispersed to be a foamed insulator made of a high-density polyethylene. Furthermore, it is possible to provide a high-frequency co-axial cable exhibiting both a low voltage standing wave ratio (VSWR) and a small amount of signal attenuation by using the resin composition.

DETAILED DESCRIPTION OF THE PREFERRED EMBODIMENTS

Hereafter, a preferred embodiment of the present invention will be described in detail with reference to the attached drawings. However, the invention is not limited to the specific embodiments described below, but various combinations of its features are possible within the scope of the invention.

Figure 1:
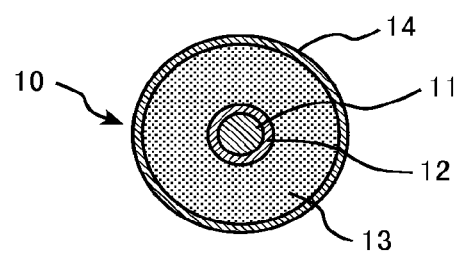
FIG. 1 is a schematic illustration in a cross-sectional view showing a structure of a foamed core of a high-frequency co-axial cable according to the present invention.

First, a high-frequency co-axial cable according to the present invention will be explained with reference to FIGS. 1 and 2. FIG. 1 is a schematic illustration in a cross-sectional view showing a structure of a foamed core of a high-frequency co-axial cable according to the present invention. As shown in FIG. 1, an internal solid layer 12 is formed on the outer periphery of an internal conductor 11; a foamed insulation layer 13 made of a resin composition according to the present invention is formed on the internal solid layer 12; and an external solid layer 14 is formed on the outer periphery of the foamed insulation layer 13, thereby configuring a foamed core 10.

Figure 2:
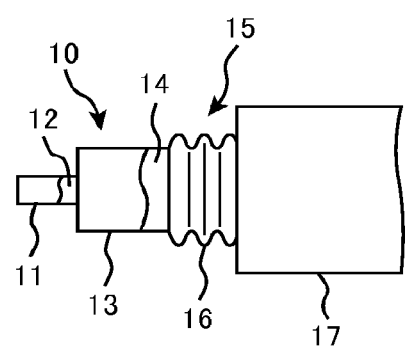
FIG. 2 is a schematic illustration in a side view showing a structure of a high-frequency co-axial cable according to the present invention.

FIG. 2 is a schematic illustration in a side view showing a structure of a high-frequency co-axial cable according to the present invention. As shown in FIG. 2, a copper corrugated or annular external conductor 16 is provided on the outer periphery of the foamed core 10; and the outer periphery of the external conductor 16 is covered by an outer coat (sheath) 17, thereby constructing a co-axial cable 15.

Figure 3:
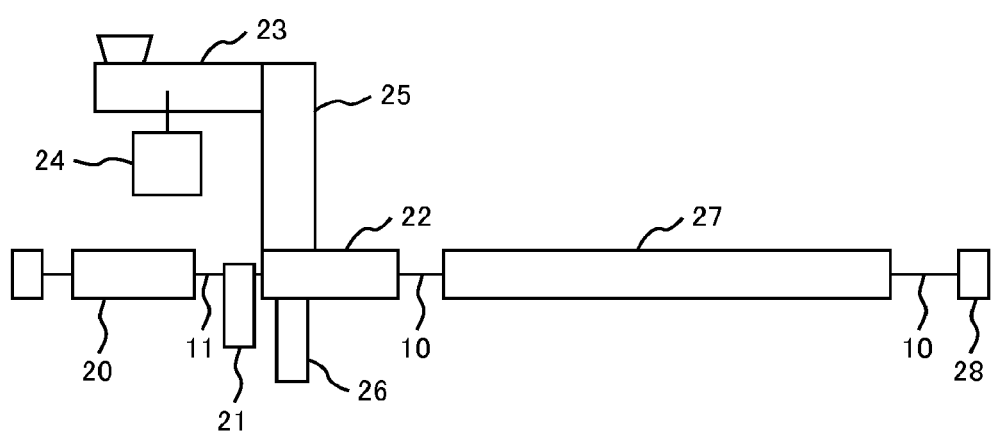
FIG. 3 is a schematic illustration showing an apparatus for producing the foamed core of high-frequency co-axial cable by use of a resin composition according to the present invention.

Next, an exemplary method for producing high-frequency co-axial cables of the present invention will be introduced. FIG. 3 is a schematic illustration showing an apparatus for producing the foamed core of high-frequency co-axial cable by use of a resin composition according to the present invention. Referring FIG. 3, while the internal conductor 11 is being fed from a feeding machine 20 to a head 22, the internal conductor 11 is covered by the internal solid layer 12 provided by an internal solid layer extruding machine 21.

The foamed insulation layer 13 is formed as follows. A resin composition of the present invention is melt-kneaded in the first extruding machine 23, where a nitrogen gas or the like is injected from the gas injection machine 24 during the melt-kneading process of the resin composition, and the resin composition is then delivered to the second extruding machine 25, where the resin composition is cooled to a temperature suitable for physical foaming. The resin composition is foamed in the second extruding machine 25, and then is delivered to the head 22, where the foamed insulation layer 13 is provided on the outer periphery of the internal solid layer 12. Furthermore, an external solid layer 14 is extruded from the external solid layer extruding machine 26 onto the outer periphery of the foamed insulation layer 13 to form a foamed core 10, and the foamed core 10 is then cooled in the cooling water tank 27 and is wound up by the winding machine 28.

(Resin Composition)

In order to solve the aforementioned problems of a high-density polyethylene when creating a foamed insulator, the inventors systematically researched high-density polyethylenes having both a small dielectric tangent (tan δ) and appropriate viscoelasticity suitable for foam-molding. Thereby, the inventors found new information as follows. By slightly crosslinking principal chains of high-density polyethylene (partially-crosslinked high-density polyethylene), it was possible to generate intertwining of molecules and to control the melt fracture tension (MT) in even the high-density polyethylene having a small number of branches.

However, when the partially-crosslinked high-density polyethylene alone was used for the foamed insulator, there was arisen another problem such that resin extrusion became unstable. Consequently, eccentricity of the internal conductor was prone to occur in a co-axial cable, making a cable connection in a connector difficult. In order to overcome the problem, the inventors further found that blending a non-crosslinked high-density polyethylene with the partially-crosslinked high-density polyethylene was effective, stabilizing the resin extrusion.

That is: a resin composition according to the present invention is composed of a polyethylene which is a mixture of partially-crosslinked high-density polyethylene (slightly-crosslinked high-density polyethylene) and non-crosslinked high-density polyethylene; the density thereof is 0.960 g/cm$^3$ or more; and the melt fracture tension thereof is within a range from 20 to 100 mN. Additionally, tan δ of the polyethylene resin composition at 2 GHz measured by a cavity resonance perturbation method is $2.0 \times 10^{-4}$ or less.

Melt fracture tension of the resin composition according to the present invention was measured by the use of a capillary rheometer having a furnace body diameter of 9.55 mm and a flat capillary having an inner diameter of 2.095 mm and a length of 8.03 mm. Measurement conditions were that: the temperature was 170° C.; the piston speed was 10 mm/min; and the taking-over acceleration was 400 m/min$^2$.

By controlling the melt fracture tension of the resin composition within the range between 20 and 100 mN, it is possible to prevent the coarsening of bubbles and make the foaming degree high in a foamed insulator. Consequently, the voltage standing wave ratio (VSWR) in a high-frequency co-axial cable including the foamed insulator can be made small, which is advantageous for efficient transmission of radio wave energy. Furthermore, by controlling tan δ at 2 GHz of the slightly-crosslinked high-density polyethylene to $2.0 \times 10^{-4}$ or less, it is possible to further reduce the loss in the high-frequency co-axial cable.

As a method of producing the slightly-crosslinked high-density polyethylene, any crosslinking method can be used. Electron beam irradiation, chemical crosslinking using a peroxide, silane graft water crosslinking and the like can be exemplified.

Specifically, in the case of irradiation crosslinking, to prevent polyethylene from deteriorating due to oxidation, the high-density polyethylene pellet is irradiated with 0.1 to 5 Mrad of electron beam in an atmosphere of inert gas, e.g., nitrogen gas, or in a vacuum. In order to make the MT value optimal, 1.0 to 4.0 Mrad is more preferable.

In the case of peroxide crosslinking, an extremely small amount of organic peroxide, e.g., dicumyl peroxide, is reacted with a high-density polyethylene in an extruding machine in which the resin temperature is to become 180° C. or higher. After that, the mixture is pelletized, thereby obtaining a slightly-crosslinked pellet.

In the case of silane graft water crosslinking, a high-density polyethylene is mixed with 0.2 to 1.0 mass % of silane compound, e.g., vinylsilane or the like, and melt-kneaded together with an appropriate reaction start agent, e.g., organic peroxides, and a crosslink reaction catalyst (dibutyltin dilaurate) thereby forming a graft polymer. After that, the graft polymer is cured for 24 hours in a water-vapor atmosphere of 80° C.; thus, the slightly-crosslinked high-density polyethylene can be obtained.

By melt-kneading the slightly-crosslinked high-density polyethylene with a non-crosslinked high-density polyethylene at an appropriate mixing ratio, a polyethylene resin composition having a melt fracture tension of 20 to 100 mN can be obtained. The amount of resin extrusion can be stabilized by blending the non-crosslinked polyethylene with the slightly-crosslinked polyethylene.

Although the mixing ratio at which the slightly-crosslinked high-density polyethylene is mixed with the non-crosslinked high-density polyethylene can be adjusted to the required properties for the cables, it is preferable that the crosslinked polyethylene be 5 to 45 mass % and the non-crosslinked polyethylene be 95 to 55 mass %. Furthermore, as melt flow rate (MFR) of slightly-crosslinked polyethylene becomes smaller, the amount of non-crosslinked polyethylene should be made larger. For example, with increasing the amount of irradiation, the melt fracture tension increases and MFR decreases. Therefore, when the amount of irradiation is 3.0 Mrad or more, it is more preferable that the mixing ratio of the crosslinked polyethylene to the non-crosslinked polyethylene be 5 to 30 mass % to 95 to 70 mass %.

In accordance with the law, a foam nucleating agent, foaming agent, antioxidant, copper inhibitor, lubricant, fire-retarding agent, colorant, ultraviolet absorber, light stabilizer, and a crosslink auxiliary agent can be added to the polyethylene composition. As a foam nucleating agent, talc, silica, boron nitride, inorganic oxides, metal oxides, and organic compounds commercially-available as chemical foaming agents can be used. For example, the chemical foaming agent, ADCA (azodicarbonamide) or OBSH (oxybenzene sulfonylhydrazide) is preferable.

(High-Frequency Co-Axial Cable)

As described before, the high-frequency co-axial cable 15 according to the present invention is fabricated such that on the outer periphery of the internal conductor 11 there are sequentially provided the internal solid layer 12, foamed insulation layer 13, external solid layer 14, external conductor 16, and the outer coat 17, and the foamed insulation layer 13 is composed of the resin composition foam body made of the aforementioned polyethylene, which is a mixture of the partially-crosslinked high-density polyethylene (slightly-crosslinked high-density polyethylene) and non-crosslinked high-density polyethylene. Thus, it was revealed that the high-frequency co-axial cable according to the present invention exhibited good high-frequency characteristics such as a low voltage standing wave ratio (VSWR) and a small amount of signal attenuation.

EXAMPLES

Next, specific examples and comparative examples will be described. However, the present invention is not limited to the specific examples described herein.

First, Table 1 shows irradiation condition, melt fracture tension (MT) at 170° C. and melt flow rate (MFR) at 190° C. of the irradiation-crosslinked high-density polyethylene (hereafter, abbreviated as HDPE) having different densities and MFRS.

TABLE 1

| High-density polyethylene (HDPE) | Irradiation amount (Mrad, nitrogen gas atmosphere) | Melt fracture tension (mN, 170° C.) | Post-irradiation melt flow rate (g/10 min, 190° C.) |
|---|---|---|---|
| Unicar 6944*[1] - A | 1.0 | 100*[5] | 1.5 |
| Unicar 6944*[1] - B | 2.5 | 280 | 0.8 |
| Unicar 6944*[1] - C | 3.0 | 400 | 0.5 |
| Ube-Maruzen 2070*[2] | 1.0 | 100 | 1.5 |
| Ube-Maruzen 2500*[3] | 1.0 | 120 | 0.7 |
| Tosoh 2300*[4] | 1.0 | 150 | 1.2 |

*[1] Nippon Unicar Company Limited, Density: 0.965, 190° C. MFR: 8.0, 170° C. MFR: 5.0;
*[2] Ube Maruzen Polyethylene Co., Ltd., Density: 0.962, 190° C. MFR: 8.0, 170° C. MFR: 5.0;
*[3] Ube Maruzen Polyethylene Co., Ltd., Density: 0.963, 190° C. MFR: 5.0, 170° C. MFR: 2.7;
*[4] Tosoh Corporation, Density: 0.953, 190° C. MFR: 7.0, 170° C. MFR: 3.8; and
*[5] MT of non-crosslinked Unicar 6944: 10 mN.

As shown in Table 1, Unicar 6944 HDPEs (density of 0.965, 190° C. MFR of 8.0, 170° C. MFR of 5.0) were separately exposed to 1.0, 2.5, and 3.0 Mrad of irradiation in a nitrogen gas atmosphere and were named 6944-A, 6944-B, and 6944-C, respectively. The melt fracture tension (MT) before irradiation crosslinking (non-crosslinked) was 10 mN, which increased 10 times or more as the result of the irradiation, and with increasing the amount of irradiation, the melt fracture tension increased and the melt flow rate (MFR) decreased. Also, Table 1 shows the melt fracture tension and melt flow rate of: Ube-Maruzen 2070 (density of 0.962, 190° C. MFR of 8.0, 170° C. MFR of 5.0) (hereafter, abbreviated as 2070); Ube-Maruzen 2500 (density of 0.963, 190° C. MFR of 5.0, 170° C. MFR of 2.7) (hereafter, abbreviated as 2500); and Tosoh 2300 (density of 0.953, 190° C. MFR of 7.0, 170° C. MFR of 3.8) (hereafter, abbreviated as 2300) when the amount of irradiation was 1.0 Mrad.

Each of the above crosslinked HDPEs was blended with a non-crosslinked HDPE or a non-crosslinked low-density polyethylene (LDPE), making a foaming material. Table 2 shows Examples 1 to 10 of blended foaming materials, and Table 3 shows Comparative examples 1 to 6.

TABLE 2

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Crosslinked HDPE | Irradiation | 6944-A | — | — | — | 10 | — | — | — | — | — | — |
| | | 6944-B | 15 | 5 | 30 | — | — | — | — | — | — | — |
| | | 6944-C | — | — | — | — | 5 | 20 | — | — | — | — |
| | | 2070 | — | — | — | — | — | — | 45 | — | — | — |
| | | 2500 | — | — | — | — | — | — | — | 30 | — | — |
| | Peroxide | 6944 | — | — | — | — | — | — | — | — | 10 | — |
| | Silane | 6944 | — | — | — | — | — | — | — | — | — | 10 |
| Non-crosslinked HDPE | | 6944 | 85 | 95 | 70 | 90 | 95 | 80 | 55 | 70 | 90 | 90 |
| Melt fracture tension at 170° C. (mN) | | | 50 | 22 | 95 | 20 | 30 | 90 | 50 | 50 | 50 | 50 |
| Sheet tanδ (cavity resonance method) at 2 GHz (×10$^{-4}$) | | | 0.9 | 1.0 | 1.2 | 0.8 | 1.1 | 1.5 | 1.3 | 1.3 | 1.8 | 1.8 |
| Melt flow rate (g/10 min) | | 170° C. | 4.5 | 6.1 | 2.9 | 5.2 | 4.9 | 3.3 | 2.0 | 3.2 | 4.1 | 4.0 |
| | | 190° C. | 5.7 | 7.2 | 4.0 | 6.8 | 6.0 | 4.6 | 3.8 | 4.5 | 6.3 | 6.3 |
| Amount of signal attenuation (dB/100 m) (2.0 GHz, 6.14 dB/100 or less passed) | | | 5.85 *C | 5.80 *C | 6.00 *C | 5.92 *C | 5.85 *C | 5.95 *C | 6.05 *C | 6.03 *C | 6.12 *D | 6.13 *D |
| VSWR (1.1 or less passed) | | | 1.03 *D | 1.07 *D | 1.03 *D | 1.08 *D | 1.03 *D | 1.05 *D | 1.05 *D | 1.06 *D | 1.06 *D | 1.07 *D |
| Air holes condition | | | None | None | None | None | None | None | None | None | None | None |
| Ability to be installed to connector | *A | | 0 | 0 | 0 | 0 | 0 | 2 | 0 | 0 | 0 | 0 |
| | *B | | *D | *D | *D | *D | *D | *D | *D | *D | *D | *D |

*A: Number of unattachable terminals (pieces/100 pieces);
*B: Evaluation (2 or less/100 pieces passed);
*C: Excellent; and
*D: Passed.

TABLE 3

| | | Comparative example | | | | | |
|---|---|---|---|---|---|---|---|
| | | 1 | 2 | 3 | 4 | 5 | 6 |
| Crosslinked HDPE | 6944-A | — | 2 | — | — | — | 100 |
| | 6944-B | — | — | — | — | — | — |
| | 6944-C | — | — | 30 | — | — | — |
| | 2300 | — | — | — | 30 | — | — |
| Non-crosslinked HDPE | 6944 | 100 | 98 | 70 | 70 | 85 | — |
| Non-crosslinked LDPE | Ube B028 (density: 0.928, 190° C. MFR: 0.5) | — | — | — | — | 15 | — |
| Melt fracture tension at 170° C. (mN) | | 10 | 12 | 120 | 50 | 30 | 100 |
| Sheet tanδ (cavity resonance method) at 2 GHz ($\times 10^{-4}$) | | 0.80 | 0.85 | 2.2 | 2.5 | 2.1 | 0.9 |
| Melt flow rate (g/10 min) | 170° C. | 5.0 | 6.5 | 2.3 | 3.2 | 3.9 | 1.0 |
| | 190° C. | 8.0 | 7.7 | 3.5 | 4.5 | 5.2 | 1.5 |
| Amount of signal attenuation (dB/100 m) (2.0 GHz, 6.14 dB/100 or less passed) | | 6.3 *E | 6.3 *E | 6.25 *E | 6.50 *E | 6.16 *E | 5.80 *C |
| VSWR (1.1 or less passed) | | 1.2 *E | 1.15 *E | 1.03 *D | 1.05 *D | 1.05 *D | 1.1 *D |
| Air holes condition | | Generated | Generated | None | None | None | None |
| Ability to be installed to the connector | *A | 50≦ | 50≦ | 0 | 0 | 0 | 5 |
| | *B | *E | *E | *D | *D | *D | *E |

*A: Number of unattachable terminals (pieces/100 pieces);
*B: Evaluation (2 or less/100 pieces passed);
*C: Excellent;
*D: Passed; and
*E: Failed.

In the case of irradiation crosslinking, a slightly-crosslinked high-density polyethylene was made by irradiating a high-density polyethylene pellet with the electron beam in a nitrogen gas atmosphere as shown in Table 1. In the case of peroxide crosslinking, 0.1 mass % of dicumyl peroxide (DCP) as an organic peroxide was added to a high-density polyethylene. In the case of silane graft water crosslinking, a high-density polyethylene, a liquid solution in which 0.05 mass % of DCP was dissolved in 0.5 mass % of vinylsilane, and 0.02 mass % of dibutyltin dilaurate were put in an extruding machine set so that resin temperature therein became 180° C. or higher, then pelletized. Subsequently, the pellet was cured for 24 hours in a water-vapor atmosphere of 80° C.

The co-axial cable was produced according to the following procedures.

Foam nucleating agent (ADCA) of 1.0 mass % was kneaded into a HDPE to form a nucleating agent master batch. The slightly-crosslinked high-density polyethylene composition was dry-blended with the nucleating agent master batch at a ratio of 99:1, thereby making a foamed layer material.

Next, the foamed insulation layer material was put into the first extruding machine 23 of the cascade-type physical foaming extruding machine, described in FIG. 3, where a nitrogen gas was injected by a gas injection apparatus 24 and the mixture was kneaded. Then, the mixture was delivered to the second extruding machine 25, where it was cooled to a temperature suitable for foaming. Subsequently, the foamed insulation layer 13 and the external solid layer 14 were simultaneously extruded onto the φ9.0-mm internal conductor 11 which had beforehand been covered by the internal solid layer 12 as an adhesion layer by the extrusion head 22, thus, a foamed insulator (foamed core 10) was obtained.

The high-foaming, high-frequency co-axial cable produced by the use of the foamed insulator was made to be a 20D annular cable having the largest amount of signal attenuation.

The amount of signal attenuation and VSWR (voltage standing wave ratio) of the co-axial cable were measured by the scalar network analyzer 8757D made by Agilent Technologies, and the cable having an amount of signal attenuation at 2.2 GHz of less than 6.14 dB/100 m was considered passed, the cable having the amount of signal attenuation of less than 6.10 dB/100 m was considered excellent, and the cable having the amount of signal attenuation of 6.15 dB/100 m or more was failed. The cable having a VSWR of 1.10 or less was considered passed.

The foaming degree of foamed core ("entire insulation layer"="internal solid layer"+"foamed insulation layer"+"external solid layer") was defined by the following Eq. (2).

$$\text{Degree of foaming}(\%) = 100 - \left(\frac{\text{Specific gravity after foaming}}{\text{Specific gravity before foaming}}\right) \times 100 \quad \text{Eq. (2)}$$

The value of melt flow rate (MFR) was measured based on JIS K7210 (ASTM D1238, ISO 1133) at 190° C. and a load of 21.8 N. Additionally, the MFR at 170° C. at which melt fracture tension was measured was also measured.

The value of tan δ was measured according to the perturbation (cavity resonator) method by the network analyzer 8720D made by Hewlett-Packard Co. with the use of the 2.0-GHz cavity resonator made by Kantoh Electronics Application and Development Inc.

Calculation formulas are shown below as Eqs. (3) to (5).

$$\varepsilon' = 1 + \frac{S_c}{\alpha S_s} \cdot \frac{F_r - F_s}{F_r} \quad \text{Eq. (3)}$$

$$\varepsilon'' = \frac{S_c}{2\alpha S_s}\left(\frac{1}{Q_s} - \frac{1}{Q_r}\right) \quad \text{Eq. (4)}$$

$$\tan\delta = \frac{\varepsilon''}{\varepsilon'} \quad \text{Eq. (5)}$$

In the above equations,
∈": Real part of complex dielectric constant;
∈': Imaginary part of complex dielectric constant;

$F_r$, $Q_r$: Resonance frequency without sample and load Q, respectively;

$F_s$, $Q_s$: Resonance frequency with sample but without load Q, respectivley;

$S_c$, $S_s$: Cross-sectional area of cavity resonator and sample perpendicular to electric field, respectively; and α: Constant determined by mode of cavity resonator.

To check an ability to be installed to a connector, the fabricated co-axial cable was cut into 100 pieces, and a 20D annular connector (N-type plug connector for Hitachi Cable 20D) was mounted to each of the 200 cable terminals. When 3 or more cables out of 100 cables failed to attach to the connector due to the eccentricity of the internal conductor, the co-axial cable was considered failed with respect to the ability to be installed to the connector. In addition, air holes condition in the foamed insulation layer was observed by an optical microscopy.

As shown in Table 2, both melt fracture tension and tan δ of Examples 1 to 10 were within the prescribed range, and the amount of signal attenuation and VSWR were all passed. The ability to be installed to the connector was also acceptable because there was no eccentricity. Furthermore, the air holes were not observed in each of the foamed insulation layers.

Melt fracture tension of each of Examples 1 to 6 was always within the prescribed range (20 to 100 mN), and tan δ of the mixture material sheet was also less than $2.0 \times 10^{-4}$ as prescribed. Therefore, the amount of signal attenuation at 2 GHz, which is one of the cable characteristics, adequately achieved 6.14 dB/100 m or less.

In Examples 7 and 8, slightly-crosslinked HDPEs were high-density polyethylenes respectively having a density of 0.962 and 0.963 g/cm³. The amount of signal attenuation, VSWR, and the ability to be installed to the connector were passed without any problem.

According to Examples 5 and 6, even if the same polyethylene was used, the melt fracture tension of the resin mixture changed depending on the mixing ratio, thus, the VSWR and the amount of signal attenuation could be further improved.

In Examples 9 and 10 that took respectively the peroxide crosslinking method and the silane crosslinking method, both the amount of signal attenuation and the VSWR were passed. Simultaneously, there was no eccentricity, and the ability to be installed to the connector was also acceptable.

On the contrary, as shown in Table 3, in Comparative example 1 which used non-crosslinked HDPE 6944 (no-irradiation), breakage of bubbles occurred during molding due to a low melt fracture tension (10 mN), causing the removal of the foaming agent (gas) and coarsening the bubbles (air holes). Consequently, the amount of signal attenuation did not satisfy the prescribed value. With respect to the ability to be installed to the connector, more than half of the cables failed to attach because there was eccentricity due to air holes.

In Comparative example 2 where 2 parts by mass of crosslinked HDPE 6944-A was added as a mixture material to 98 parts by mass of non-crosslinked HDPE 6944, the melt fracture tension was 12 mN, which is lower than the lower limit of the prescribed value (20 mN), similar to the non-irradiation case, generating air holes when foaming. Consequently, the amount of signal attenuation did not satisfy the prescribed value. With respect to the ability to be installed to the connector, more than half of the cables failed to attach because there was eccentricity due to the occurrence of air holes in the foamed insulation layer.

In Comparative example 3 where 30 parts by mass of crosslinked HDPE 6944-C was added to 70 parts by mass of non-crosslinked HDPE 6944, the melt fracture tension of the mixture material was 120 mN, which exceeds the upper limit of the prescribed value (100 mN), and the amount of signal attenuation did not satisfy the prescribed value because the degree of foaming in the entire insulation layer decreases. It is presumable that MT became too large, inhibiting the flowability.

In Comparative example 4 which used a mixture of crosslinked HDPE 2300 having a density of 0.953 g/cm³ and non-crosslinked HDPE (6944), the density of 2300 is less than the prescribed value (0.960 g/cm³), tan δ of the mixture was $2.5 \times 10^{-4}$ which was higher than the prescribed value, and the amount of signal attenuation did not satisfy the prescribed value.

In Comparative example 5 that used an LDPE having large melt fracture tension instead of using a slightly-crosslinked HDPE, tan δ of the sheet was higher than the prescribed value, and the amount of signal attenuation did not satisfy the prescribed value.

In Comparative example 6 that used only a slightly-crosslinked HDPE, flowability at extrusion was poor, and eccentricities were found here and there because of the unstable amount of resin extrusion. Consequently, with respect to the ability to be installed to the connector, 5 cables out of 100 cables failed to attach, and the comparative example was considered failed.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A resin composition to be used for a foamed insulator, he resin composition being made of a mixture of a partially-crosslinked polyethylene and a non-crosslinked polyethylene, the partially-crosslinked polyethylene having principal chains of polyethylene slightly crosslinked with one another the partially-crosslinked polyethylene and the non-crosslinked polyethylenelene being not crosslinked with each other in the mixture, and the mixture having a density of 0.960 g/cm³ or more and a melt fracture tension within a range from 20 to 100 mN.

2. The resin composition according to claim 1, wherein the mixture comprises 5 to 45 mass % of the partially-crosslinked polyethylene and 95 to 55 mass % of the non-crosslinked polyethylene.

3. The resin composition according to claim 2, wherein the partially-crosslinked polyethylene is crosslinked by irradiating a high-density polyethylene with 0.1 to 5.0 Mrad of electron beam.

4. A high-frequency co-axial cable, comprising sequentially: an internal conductor; an internal solid layer; a foamed insulation layer; an external solid layer; an external conductor; and an outer coat, the foamed insulation layer being composed of a foam body of the resin composition according to claim 3, wherein the foamed insulation layer exhibits dielectric tangent value of $2.0 \times 10^{-4}$ or less at 2 GHz by a cavity resonance perturbation method.

5. The resin composition according to claim 2, wherein the partially-crosslinked polyethylene is crosslinked by addition of 0.2 to 1.0 parts by mass of a silane compound to 100 parts by mass of a high-density polyethylene.

6. A high-frequency co-axial cable, comprising sequentially: an internal conductor; an internal solid layer; a foamed insulation layer; an external solid layer; an external conductor; and an outer coat, the foamed insulation layer being composed of a foam body of the resin composition according to claim 5, wherein the foamed insulation layer exhibits dielectric tangent value of $2.0 \times 10^{-4}$ or less at 2 GHz by a cavity resonance perturbation method.

7. The resin composition according to claim 2, wherein the partially-crosslinked polyethylene is crosslinked by addition of an organic peroxide to a high-density polyethylene.

8. A high-frequency co-axial cable, comprising sequentially: an internal conductor; an internal solid layer; a foamed insulation layer; an external solid layer; an external conductor; and an outer coat, the foamed insulation layer being composed of a foam body of the resin composition according to claim 7, wherein the foamed insulation layer exhibits dielectric tangent value of $2.0 \times 10^{-4}$ or less at 2 GHz by a cavity resonance perturbation method.

9. A high-frequency co-axial cable, comprising sequentially: an internal conductor; an internal solid layer; a foamed insulation layer; an external solid layer; an external conductor; and an outer coat, the foamed insulation layer being composed of a foam body of the resin composition according to claim 2, wherein the foamed insulation layer exhibits dielectric tangent value of $2.0 \times 10^{-4}$ or less at 2 GHz by a cavity resonance perturbation method.

10. The resin composition according to claim 1, wherein the partially-crosslinked polyethylene is crosslinked by irradiating a high-density polyethylene with 0.1 to 5.0 Mrad of electron beam.

11. A high-frequency co-axial cable, comprising sequentially: an internal conductor; an internal solid layer; a foamed insulation layer; an external solid layer; an external conductor; and an outer coat, the foamed insulation layer being composed of a foam body of the resin composition according to claim 10, wherein the foamed insulation layer exhibits dielectric tangent value of $2.0 \times 10^{-4}$ or less at 2 GHz by a cavity resonance perturbation method.

12. The resin composition according to claim 1, wherein the partially-crosslinked polyethylene is crosslinked by addition of 0.2 to 1.0 parts by mass of a silane compound to 100 parts by mass of a high-density polyethylene.

13. A high-frequency co-axial cable, comprising sequentially: an internal conductor; an internal solid layer; a foamed insulation layer; an external solid layer; an external conductor; and an outer coat, the foamed insulation layer being composed of a foam body of the resin composition according to claim 12, wherein the foamed insulation layer exhibits dielectric tangent value of $2.0 \times 10^{-4}$ or less at 2 GHz by a cavity resonance perturbation method.

14. The resin composition according to claim 1, wherein the partially-crosslinked polyethylene is crosslinked by addition of an organic peroxide to a high-density polyethylene.

15. A high-frequency co-axial cable, comprising sequentially: an internal conductor; an internal solid layer; a foamed insulation layer; an external solid layer; an external conductor; and an outer coat, the foamed insulation layer being composed of a foam body of the resin composition according to claim 14, wherein the foamed insulation layer exhibits dielectric tangent value of $2.0 \times 10^{-4}$ or less at 2 GHz by a cavity resonance perturbation method.

16. A high-frequency co-axial cable, comprising sequentially: an internal conductor; an internal solid layer; a foamed insulation layer; an external solid layer; an external conductor; and an outer coat, the foamed insulation layer being composed of a foam body of the resin composition according to claim 1.

17. The high-frequency co-axial cable according to claim 16, wherein
the foamed insulation layer exhibits dielectric tangent value of $2.0 \times 10^{-4}$ or less at 2 GHz by a cavity resonance perturbation method.

18. A resin composition comprising a mixture of a partially-crosslinked polyethylene and a non-crosslinked polyethylene, the partially-crosslinked polyethylene having principal chains of polyethylene slightly crosslinked with one another, the partially-crosslinked polyethylene and the non-crosslinked polyethylene being not crosslinked with each other in the mixture, and the mixture having a density of 0.960 g/cm$^3$ or more and a melt fracture tension within a range from 20 to 100 mN.

19. The resin composition according to claim 18, wherein the mixture comprises 5 to 45 mass % of the partially-crosslinked polyethylene and 95 to 55 mass % of the non-crosslinked polyethylene.

20. The resin composition according to claim 18, wherein the partially-crosslinked polyethylene is crosslinked by irradiating a high-density polyethylene with 0.1 to 5.0 Mrad of electron beam.

* * * * *